United States Patent Office 3,511,672
Patented May 12, 1970

3,511,672
GERMANIUM-SELENIUM-MANGANESE GLASS COMPOSITIONS
Albert Ray Hilton, Richardson, Tex., assignor to Texas Instruments Incorporated, Dallas, Tex., a corporation of Delaware
No Drawing. Filed Nov. 7, 1967, Ser. No. 681,122
Int. Cl. C03c 3/12, 3/30
U.S. Cl. 106—47    2 Claims

ABSTRACT OF THE DISCLOSURE

Disclosed are compositions of matter comprising germanium, selenium, and manganese which have been found to be glasses transmitting in the infrared region of the electromagnetic spectrum. Also disclosed are methods of compounding these compositions, of obtaining softening point data for the glasses, and a description of the use of the glasses of this invention as a transmitting element within an infrared detection system.

This invention relates to amorphous compositions of matter consisting essentially of germanium, selenium, and manganese which have been found to be glasses transmitting in the infrared region of the electromagnetic spectrum.

Disclosed are two glass compositions: one contains about 10 atomic percent germanium, 80 atomic percent selenium, and 10 atomic percent manganese; the other contains about 15 atomic percent germanium, 70 atomic percent selenium, and 15 atomic percent manganese. Each composition may be made by reacting the constituents at a temperature above 1200° C. to form a melt and then quench cooling the melt. The invention provides glass compositions having good transmission in the 1–20 micron wavelength region of the electromagnetic spectrum.

It is therefore an object of the invention to provide a ternary amorphous composition consisting essentially of germanium, selenium, and manganese and having good transmittance in the 1–20 micron wavelength region of the electromagnetic spectrum.

These and other objects, advantages, and features of the invention will become more readily understood from the following detailed description when read in conjunction with the appended claims.

The general procedure for making each of the compositions of the invention may be described as follows: the appropriate amounts of the constituents are weighed and then placed in a previously cleaned quartz ampoule, which is then evacuated to about $10^{-3}$ torr and sealed by fusion. The sealed ampoule is placed in a boron nitride or graphite support within a furnace and gradually heated to a temperature above 1200° C., for example 1300° C., and held at that temperature for a time sufficient for the constituents to react completely with one another, such as one hour. The ampoule containing the sample is then rapidly withdrawn from the furnace to air at room temperature to air quench cool the melt to a solid. After the sample has cooled to room temperature, the fused quartz amopule is broken and the glassy material removed.

The sample compositions which were found to form glasses by the air quench cooling technique are presented in Table I below.

TABLE I

| Sample No. | Composition (atomic percent) | | |
|---|---|---|---|
| | Germanium | Selenium | Manganese |
| 139 | 10 | 80 | 10 |
| 140 | 15 | 70 | 15 |

Glasses are supercooled liquids and do not have "melting points." Instead, the highly viscous glass softens as the temperature increases and the softening temperature may be defined at a specified viscosity. The softening points obtained were determined according to the temperature and viscosity at which the glass deformed under the following stress conditions.

A polished sample $0.85 \pm 0.15$ mm. thick was placed in an enclosure provided with suitable heating means and a pointed quartz rod, spring-loaded to 70 grams, pressed against one face of the sample. The rod was in perpendicular alignment with respect to the sample, and the point defined a 90° included angle. A thermocouple measured the temperature of the opposite face. The temperature was raised at a rate of 8 to 10° C. per minute until the point penetrated 0.05 mm. into the sample. This softening point corresponded to a viscosity of $1 \times 10^{10.2}$ piose as determined by calibration against a standard glass, No. 712 obtained from the National Bureau of Standards.

The softening points for the glasses of the invention were found to be about 290° C.

Each of the glass compositions disclosed herein were found to transmit infrared radiation, i.e., electromagnetic radiation in the 1–20 micron region. The glass compositions of this invention offer substantial advantages for the fabrication of infrared transmitting elements.

The glass compositions of this invention are usable within an infrared detecting system. A detecting system is normally composed of a detector having a responsive element sensitive to infrared energy striking its surface, and an infrared transmitting element such as a dome or lens in optical connection with the detector. The optical properties of the amorphous compositions of this invention make them particularly suited among other applications for use as a transmitting element. In addition to being substantially transparent to infrared rays over a broad raneg of the infrared spectrum, all of the compositions have relatively high indexes of refraction compared to oxide glasses. Consequently, when infrared rays strike the dome, the high index of refraction of the dome material causes the rays to be bent toward the detector unit at a greater angle of refraction, thus increasing the efficiency of detection.

What is claimed is:
1. A ternary glass composition consisting essentially of 10 atomic percent germanium, 80 atomic percent selenium, and 10 atomic percent manganese.
2. A ternary glass composition consisting essentially of 15 atomic percent germanium, 70 atomic percent selenium, and 15 atomic percent manganese.

References Cited

UNITED STATES PATENTS 3,360,649   12/1967   Brau et al. _____ 106—47
3,440,068   4/1969    Patterson et al. _____ 106—47

HELEN M. McCARTY, Primary Examiner

U.S. Cl. X.R.

250—83